United States Patent [19]
Moates

[11] Patent Number: 5,637,241
[45] Date of Patent: Jun. 10, 1997

[54] WELDER CABLE MONITOR

[75] Inventor: Benjamin S. Moates, Knoxville, Tenn.

[73] Assignee: Computational Systems, Inc., Knoxville, Tenn.

[21] Appl. No.: 590,120

[22] Filed: Jan. 23, 1996

[51] Int. Cl.$^6$ .................................................. B23K 11/25
[52] U.S. Cl. .................................................. 219/109
[58] Field of Search .................................. 219/109, 110, 219/130.01

[56] References Cited

U.S. PATENT DOCUMENTS

| | | | |
|---|---|---|---|
| 4,647,751 | 3/1987 | Yoshimura et al. | 219/109 |
| 4,739,149 | 4/1988 | Nishiwaki et al. | 219/130.01 |
| 4,973,813 | 11/1990 | Mitchell | 219/109 |
| 4,999,477 | 3/1991 | Yamaguchi et al. | 219/109 |
| 5,262,609 | 11/1993 | Nowak et al. | 219/109 |

FOREIGN PATENT DOCUMENTS

1155402 A  5/1985  U.S.S.R. .

*Primary Examiner*—Clifford C. Shaw
*Attorney, Agent, or Firm*—Luedeka, Neely & Graham, P.C.

[57] ABSTRACT

The electrical power supply cables (shunt cables) of a robotic welding machine are continuously monitored during welding operations to determine cable fatigue resulting from mechanical flexing and high electrical current flow. Increases in cable resistance, being representative of a fatigued cable, are determined by measuring voltage across the cables. When a threshold voltage level or threshold voltage increase is reached, a monitor outputs a signal alerting plant personnel of the fatigued cable. The alert signal may further provide plant personnel with a predetermined time to cold weld failure of the fatigued cable, allowing plant personnel to schedule replacement of the fatigued cable during production breaks or scheduled downtime. In one embodiment, robotic welders and associated cable monitors are networked to a centralized computer to identify and isolate fatigued cables.

18 Claims, 3 Drawing Sheets

WELDER CABLE MONITOR

TECHNICAL FIELD

The present invention relates generally to an apparatus and method of monitoring for failures in industrial robotic welding machines. More particularly, the invention relates to an apparatus and method of predictive maintenance in robotic welding machines by monitoring voltage across shunt cables that provide electrical power to the welding tips of the machine.

BACKGROUND OF THE INVENTION

The use of robotic welding machines is prevalent throughout many industries today. Robotic welders are versatile, efficient, and when operating properly they consistently produce high quality welds, making them an important element of many manufacturing processes. While robotic welding machines generally can be found in a variety of configurations, they universally suffer problems from shunt cables (power supply cables) that fail unexpectedly during service. Shunt cables typically fail as a result of mechanical flexing caused by robotic motion of the welding machine. The flexing causes cable strands to fatigue and eventually leads to increased cable resistance and breakage.

As a cable begins to fatigue, the electrical resistance of the cable increases. The higher cable resistance causes a reduction in current flow through the cable to the welding tips. This in turn causes the welding machine to produce "cold welds" which are highly susceptible to failure. A typical manufacturing plant may have dozens of robotic welding machines and significant production losses can occur while maintenance technicians attempt to locate and repair a problem cable.

It is estimated that 90% of unscheduled robotic welder downtown is attributable to shunt cable failures. Therefore, elimination of this downtime causal factor would represent a quantum leap in reducing the costs and production losses associated with unscheduled downtime. Unfortunately, there are currently no known procedures for effectively and efficiently determining when a shunt cable is fatigued and near breakage. Resistance meters and thermographic scanners are readily available for this task, but neither offers the ability to measure cable resistance continuously and automatically alert plant personnel of an impending cable failure. Although manufacturers are working to develop cables that last longer, extending cable life has proven difficult due to the high electrical currents that these cables carry and the continuous flexing they endure during welding operations.

Therefore, there is a need for a continuous, on-line, welder cable monitor capable of predicting and isolating shunt cable failures so that fatigued cables can be efficiently repaired with a minimum of production downtime.

SUMMARY OF THE INVENTION

The invention provides a monitor for substantially continuously determining the operating condition of a shunt cable providing an electrical voltage and current to the weld tips of a welding machine. The monitor includes a plurality of electrical conductors connected to the shunt cable which produce electrical signals corresponding to voltage across the shunt cable. A monitor unit receives the electrical signals, determines a shunt cable voltage across the shunt cable, compares the shunt cable voltage to a first predetermined threshold, and produces a first signal indicating cable fatigue when the shunt cable voltage exceeds the first predetermined threshold.

The first signal may be an alert signal that informs plant personnel of a predetermined time to shunt cable failure. Alternatively, the first signal may be a failure signal indicating the occurrence of a shunt cable failure resulting in insufficient current flow to the weld tips of the machine.

The monitor unit may be configured to compare the shunt cable voltage to a second predetermined threshold that is greater than the first predetermined threshold. As a result of this comparison, a second signal is produced indicating cable fatigue when the shunt cable voltage exceeds the second predetermined threshold. In this configuration, the first signal is an alert signal as discussed above and the second signal is the failure signal discussed above.

The present invention also provides a system for monitoring the operating condition of robotic welding machine shunt cables. The system includes a plurality of robotic welding machines. Each robotic welding machine includes a pair of welding tips, a pair of shunt cables connected to the welding tips for delivering electrical voltage and current to the welding tips, and an electrical power source to provide the voltage and current. Electrical conductors are connected to each pair of shunt cables to produce electrical signals corresponding to voltages across each of the shunt cables. A monitoring network is connected to the electrical conductors to receive the electrical signals, determine shunt cable voltages across each of the shunt cables, compare the shunt cable voltages to a first predetermined threshold, and produce a first signal corresponding to cable fatigue when at least one of the shunt cable voltages exceeds the first predetermined threshold.

The monitoring network may further include a plurality of monitors connected to certain ones of the electrical conductors. Each monitor receives the electrical signals produced by the electrical conductors to which it is connected, determines shunt cable voltages corresponding to the electrical signals, compares the shunt cable voltages to predetermined thresholds, and produces the first signal corresponding to cable fatigue when a shunt cable voltage exceeds a predetermined threshold. The monitoring network also includes a plurality of monitoring units where each of the monitoring units is connected to a unique one of the monitors for receiving and outputting the first signal produced by each monitor. A computer is connected to the monitoring units to receive each of the first signals and provide to an operator an indication of cable fatigue when one or more first signals are received by the computer.

Each of the welding machines may further include a transformer. Each of the monitors is then connected to a unique one of the transformers to determine whether the transformer is producing an electrical output. The monitors determine a shunt cable voltage only when a transformer produces an electrical output.

Also provided by the present invention is a method of determining fatigue in a welding machine shunt cable. The method includes the step of determining a shunt cable voltage across the shunt cable substantially continuously at least while the welding machine is welding. The shunt cable voltage is compared to a first predetermined threshold, and a first signal is produced corresponding to cable fatigue when the shunt cable voltage exceeds the first predetermined threshold. The predetermined threshold may be determined by trending the shunt cable voltage over time to produce an average shunt cable voltage, and then calculating a predetermined percentage of the shunt cable voltage to produce the first predetermined threshold. This method may be applied to a network of robotic welding machines as well.

BRIEF DESCRIPTION OF THE DRAWINGS

The invention will now be described in further detail with reference to the drawings wherein like reference characters designate like or similar elements throughout the several drawings as follows.

DETAILED DESCRIPTION OF THE PREFERRED EMBODIMENT

Figure 1:
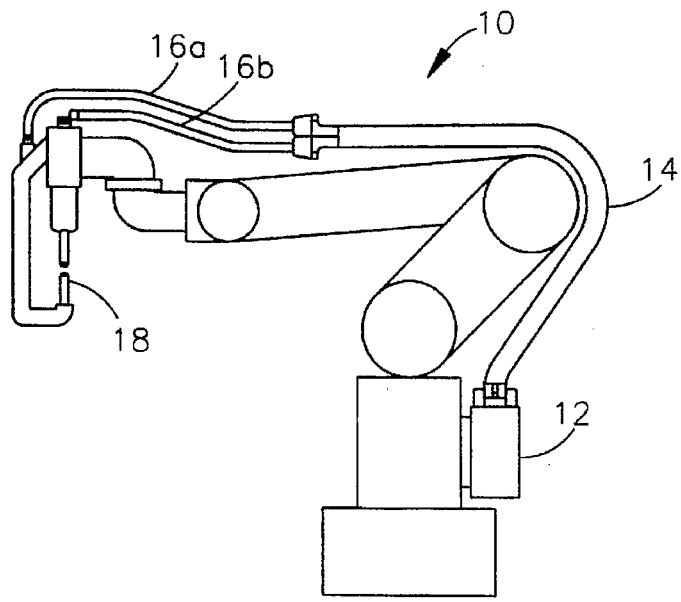
FIG. 1 is a side view of a typical industrial robotic spot welder.

The present invention solves the problems associated with unscheduled maintenance and production delays resulting from shunt cable failures on welding machines, particularly robotic welding machines, by continuously monitoring the electrical properties of the cables during operation of the robotic welder. FIG. 1 illustrates a typical industrial robotic spot welder 10 having a transformer 12, primary shunt cable 14, a pair of secondary shunt cables 16a and 16b, and weld tips 18. For a typical application, shunt cables 14, 16a, and 16b are stranded cables carrying 15,000 amps to the weld tips during welding operations. Robotic motions of the welder 10 produce a great deal more flexure within the secondary shunt cables 16a, 16b than occurs in the primary shunt cable 14, resulting in a much higher failure rate of the secondary shunt cables 16a, 16b. High mechanical flexure combined with high current flow eventually causes the strands of the cables 16a, 16b to fatigue and break. When the strands of the cables 16a, 16b begin to fatigue and break, the electrical resistance of the cables 16a, 16b increases. The increased cable resistance results in less current being provided to the weld tips 18 and, resultingly, the welder 10 will produce what is commonly referred to as a "cold weld" which lacks the structural integrity of a weld produced with sufficient heating of the surrounding metal.

At this point it should be noted that, although the preferred embodiments described herein relate primarily to robotic welding machines, the present invention is equally applicable to welding machines that are manually operated.

In many robotic welders 10, electrical current is regulated so that as the shunt cables 16a, 16b begin to fatigue and break, current flow through the cables 16a, 16b increases proportionately to prevent cold welds. This increasing current flow accelerates the failure process, producing increasing resistance and heating of the fatigued cables 16a, 16b. In effect, the increasing current exponentially accelerates the catastrophic failure of the cables 16a, 16b.

Figure 2:
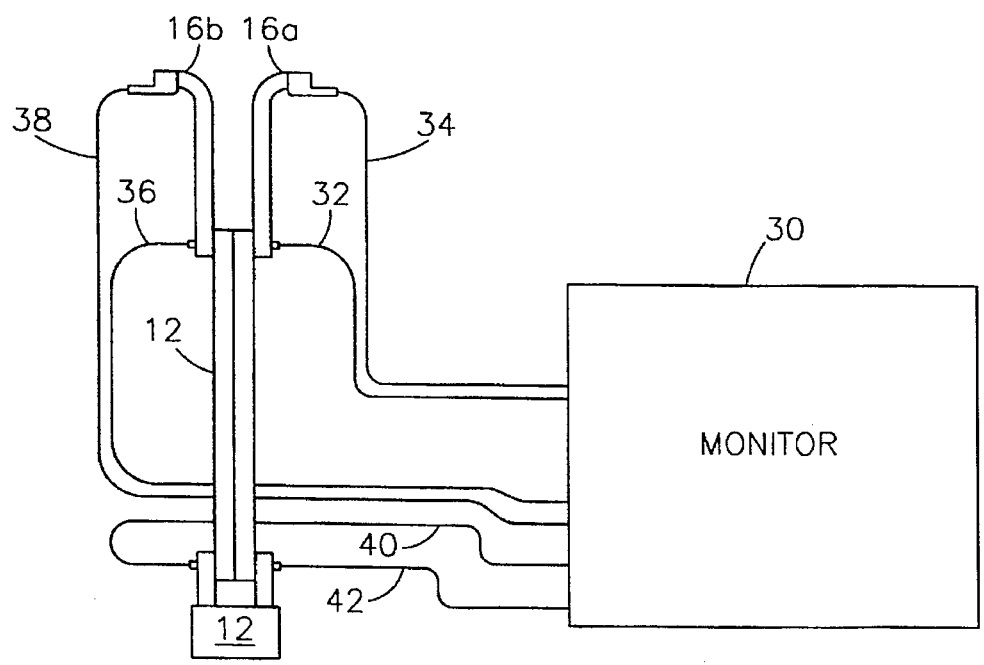
FIG. 2 is a wiring diagram showing lead wire connections between a cable monitor and a pair of shunt cables, and lead wired connections between the monitor and a transformer providing power to the shunt cables.

It has been determined that by continuously monitoring the resistive condition of the shunt cables 16a, 16b during welding operations, one can determine when the cables 16a, 16b have become fatigued and therefore predict a time to failure of the shunt cables 16a, 16b. FIG. 2 illustrates a wiring diagram for monitoring cable resistance. As shown in FIG. 2, two pairs of lead wires 32, 34 and 36, 38 are attached as shown to the secondary shunt cables 16a, 16b to measure small voltage drops across the cables 16a, 16b during welding operations. In practice, lead wires 32–38 can be easily attached to the shunt cables 16a, 16b and will not interfere with the replacement ease of a shunt cable 16a, 16b. The lead wires 32–38 are preferably small diameter wires, such as RG-174 co-axial cable or twisted pair, and their small size and current loading make them relatively immune to the problems of flexing and high current loading associated with the shunt cables 16a, 16b. Since voltage drop across each of the cables 16a, 16b is proportional to the product of current and resistance, an increasing voltage will indicate an increasing cable resistance, assuming a constant or increasing current. As previously discussed, many robotic welders incorporate a regulated current supply system that automatically increases current to compensate for increased resistance in the welder 10. Therefore, for a constant or increasing current, an increasing voltage will indicate an increasing cable resistance.

With continued reference to FIG. 2, lead wires 32–38 are connected to a monitor 30 which determines the voltage drop across each of the shunt cables 16a, 16b based on electrical signals provided by the lead wires 32–38. Resistors 42, 44, 46, and 48, which in a preferred embodiment are 150 K ohm resistors, are positioned in-line on each lead wire 32–38. Monitor 30 then measures the voltage drop across each cable 16a, 16b by determining the voltage differential between each pair of lead wires 32, 34 and 36, 38. For example, to measure the voltage drop across cable 16a, monitor 30 determines the difference between the voltage on lead wire 32 and the voltage on lead wire 34. Similarly, the voltage drop across cable 16b is measured by determining the difference between the voltages on lead wires 36 and 38.

Figure 4:
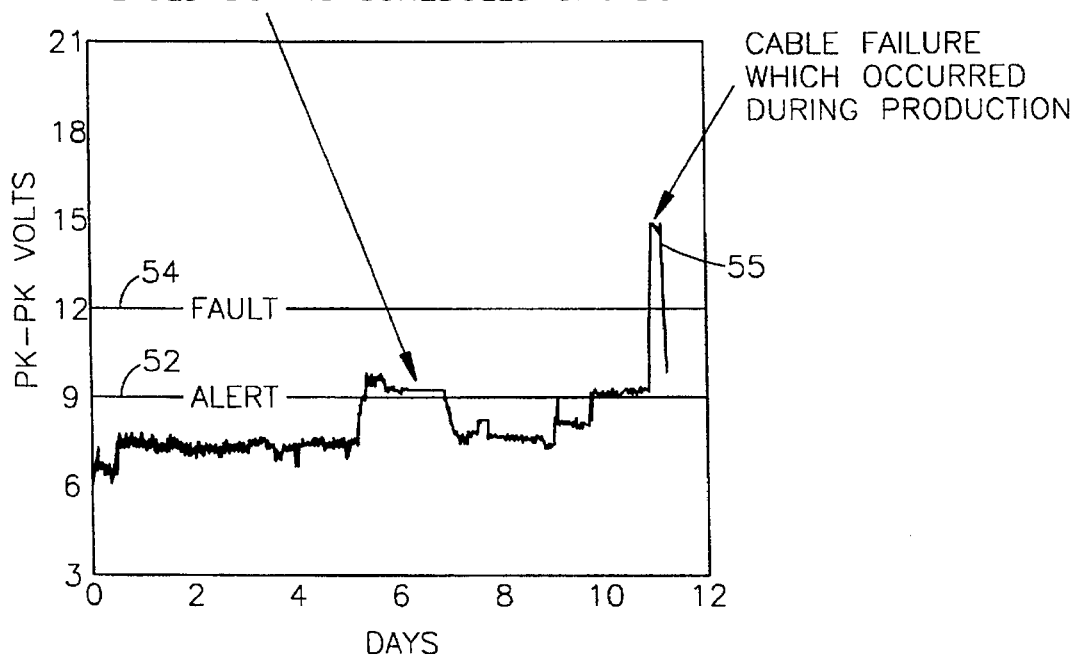
FIG. 4 is a graph illustrating voltage levels measured across a shunt cable prior to and during failure of the cable.

Since an increase in shunt cable voltage is indicative of a fatigued or failed cable, monitor 30 looks for a predetermined threshold voltage level to be reached, or alternatively, a threshold voltage increase. This threshold voltage level is the failure point at which the robotic welder 10 will begin to produce cold welds (hereinafter sometimes referred to as the cold weld failure point). Invariably, once the cold weld failure point is reached, a catastrophic failure of the cable 16a, 16b will soon follow as illustrated by the data presented in FIG. 4. The graph of FIG. 4 was produced from actual data taken from a shunt cable that failed during production where horizontal line 52 depicts the alert voltage level indicating impending failure, horizontal line 54 depicts the voltage level signaling cold weld cable failure, and vertical line 55 depicts catastrophic failure. When the alert voltage level (line 52) of a cable 16a, 16b is reached, monitor 30 outputs a signal alerting plant personnel of the fatigued cable and impending failure. Preferably, the signal will also serve to inform plant personnel of a predetermined time to cold weld failure of the cable 16a, 16b. When the voltage across cable 16a, 16b reaches the cold weld failure voltage (line 54), a failure signal is generated by the monitor 30.

Operational characteristics vary between shunt cables 16a, 16b of different sizes and types, and even between individual shunt cables 16a, 16b of the same size and type. Therefore, a preferred embodiment of the invention predicts the failure of a particular cable by trending the cable voltage levels over a period of time and then determining a threshold alert voltage level based on a percentage increase.

To produce accurate trend data, the trended cable voltages must only be voltages that are measured during a welding operation. Although this can be achieved in a number of ways, the preferred embodiment illustrated in FIG. 2 monitors the output voltage of the transformer 12 to determine when the robotic welder 10 is welding. Lead wires 40 and 42 are used to provide this information to the monitor 30, thereby enabling the monitor to only obtain trend data during welding operations. In another preferred embodiment where the monitor 30 is connected to a robotic welder controller, typically a programmable logic controller (PLC) as will be further discussed herein, the PLC provides the monitor with information necessary to determine when the robotic welder 10 is making a weld.

Figure 3:
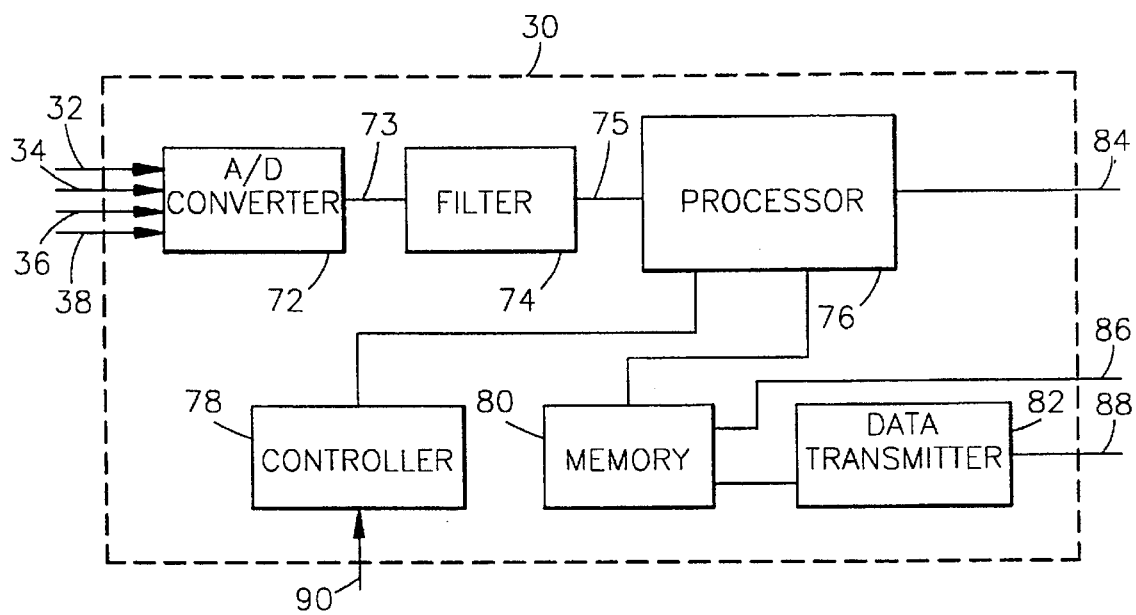
FIG. 3 is a schematic circuit diagram of a shunt cable monitor.

A schematic circuit diagram of a preferred monitor 30 is illustrated in FIG. 3. Lead wires 32–36 are interconnected between the secondary shunt cables 16a, 16b and the monitor 30. At monitor 30, the signals on each of the lead wires 32–36 are received by an analog-to-digital converter 72 where the analog voltage signals carried by the wires 32–36 are converted to digitial form. The digitized voltage signals are provided to a filter 74 via lines 73 where noise and transients are removed. The filtered shunt cable voltage signals are then output on lines 75 and received by processor 76, which in a preferred embodiment is an Intel 80486 microprocessor. Software residing in processor 76 compares the shunt cable voltages on lines 75 with alarm and failure voltage levels (threshold voltage levels) previously provided to the processor 76. When a shunt cable voltage reaches an alarm or failure threshold level, an appropriate signal representing the condition of the shunt cable 16a, 16b is output by the processor 76 via lines 84. In one embodiment, a centralized computer 60 (FIG. 5) alerts plant personnel in response to signals output on lines 84.

Preferably, alarm and failure levels are initially user defined. The user defined levels can be adjusted over time for greater accuracy by trending of the data provided on lines 75.

Shunt cable voltage data is preferably stored in memory 80 where it can be later retrieved and displayed at a local monitor terminal (not shown). To display the condition of the shunt cables 16a, 16b and historical trend data at a remote terminal, a data transmitter 82, such as a modem, is provided. In response to an appropriate request signal received by the data transmitter 82, the data transmitter 82 transmits the trend data, as well as visual alarm and failure indications, to the remote system.

To ensure the accuracy of trend data stored in memory 80, trend data is stored only during welding operations. Lead wires 40, 42 are interconnected to the transformer 12 (FIG. 2) and monitor 30 to provide the monitor 30 with an indication of when transformer 12 is producing a voltage output. At monitor 30, the voltage signals on wires 40, 42 are received by a controller 78 via lines 90. When the signals on wires 40, 42 indicate that the transformer 12 is providing electrical power to the weld tips, the controller 78 issues an appropriate signal to the processor 76 so that storage of trend data can commence. Alternatively, controller 78 will inform processor 76 that the machine is welding in response to an appropriate signal received from the PLC 62 on lines 90.

Figure 5:
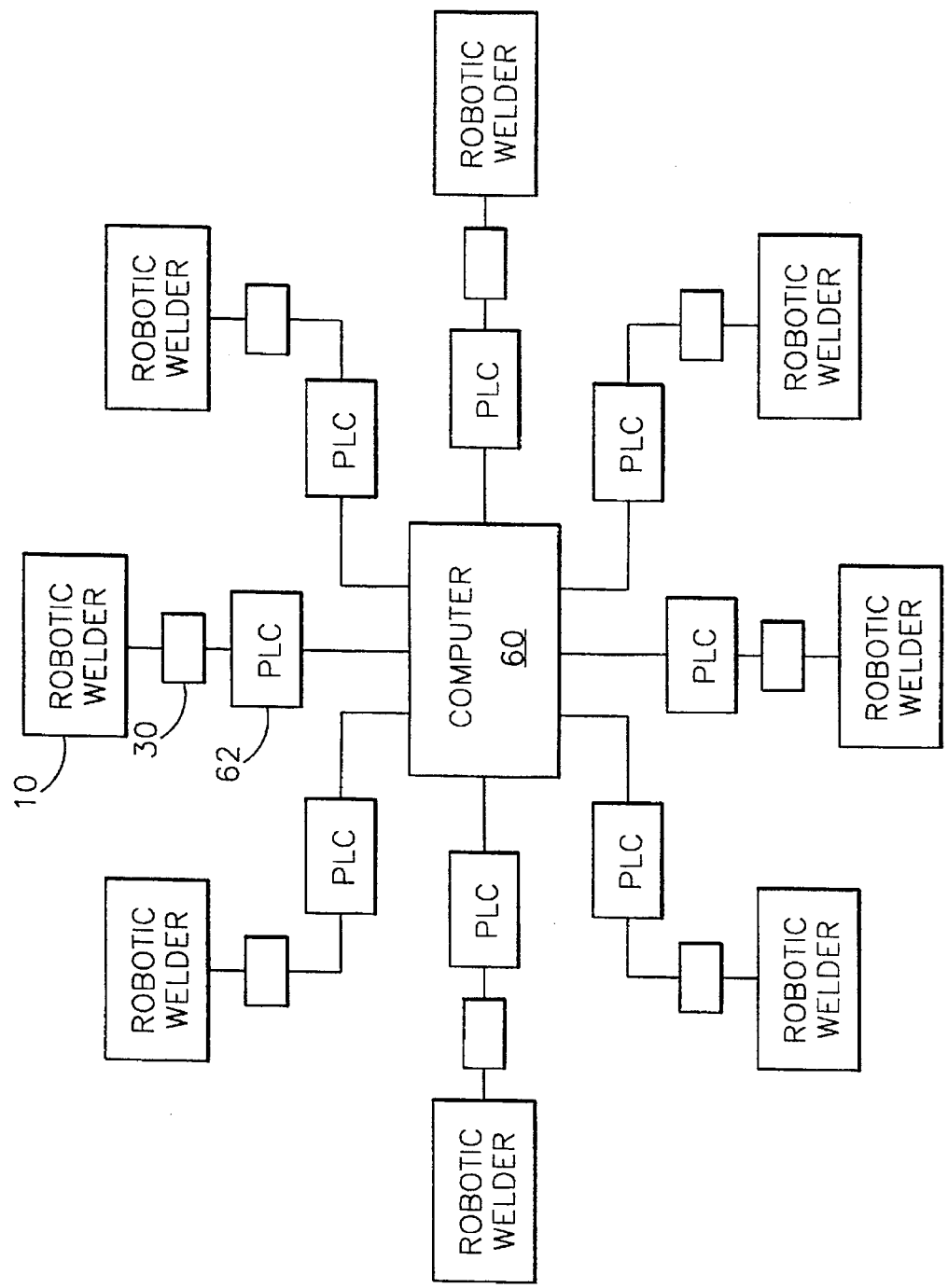
FIG. 5 is a block diagram of a typical arrangement of robotic welders networked to a centralized computer system.

In the typical factory setting, several robotic welders 10 are employed at various stages of production with each robotic welder 10 being networked to and centrally controlled by a main computer 60 and programmable logic controller 62 (PLC), as illustrated in FIG. 5. In this configuration, monitoring for shunt cable failures in any of the welders 10 is fully automated. Each PLC 62 receives an alert signal from a corresponding monitor 30 when the predetermined threshold shunt cable voltage (alert voltage) is reached, and provides the alert signal to main computer 60. Main computer 60 then provides an indication to plant personnel that a particular shunt cable 16a, 16b on a particular welder 10 has fatigued. In a preferred embodiment, computer 60 also provides plant personnel with a predetermined time to failure of the fatigued shunt cable 16a, 16b, thereby enabling cable replacement to occur during production breaks or scheduled downtime. Likewise, when the cold weld failure voltage (line 54) is reached, a failure signal is provided to the corresponding PLC 62, and it provides a failure signal to computer 60.

The computer 60 preferably provides plant personnel with both visual and aural indications of the alert signal, the time to failure, and the failure signal. For example, in a FANAUC welding robot with base mounted transformer having so called "kickless" primary shunts and standard water cooled secondary shunts, the secondary shunt cable threshold voltage is typically about nine (9) volts peak to peak and, once cable fatigue causes the threshold voltage to be exceeded, the predetermined time to cold weld failure of the shunt cable 16a, 16b is typically about 25 to 30 welding hours.

The actual time to failure, once the threshold voltage is exceeded, varies between individual robots and individual cables 16a, 16b. Historical data at some plants indicates that by changing the secondary shunt cables 16a, 16b on some robots every two weeks, about 80% of unexpected failures can be eliminated. Some cables will fail within only a few days while others will function properly for at least a month. Likewise, the time to failure for individual cables 16a, 16b will vary somewhat.

The accuracy of the predetermined time to failure prediction can be enhanced by trending shunt cable performance with monitor 30. By trending, what is meant is that each time the threshold voltage level is exceeded monitor 30 records the actual time to failure. The predicted time to failure is then determined statistically from the recorded actual times. For example, if the exemplary FANAUC robot previously described over time experiences an average time to failure of 26.5 welding hours, then the trended 26.5 welding hours could be provided to plant personnel as the predicted time to failure when the threshold voltage is exceeded. Therefore, actual times to failure are statistically trended over time to provide a more accurate prediction of the time to failure for each individual robot.

It is contemplated, and will be apparent to those skilled in the art from the foregoing specification, drawings, and examples that modifications and/or changes may be made in the embodiments of the invention. Accordingly, it is expressly intended that the foregoing are illustrative of preferred embodiments only, not limiting thereto, and that the true spirit and scope of the present invention be determined by reference to the appended claims.

What is claimed is:

1. A monitor for substantially continuously determining the operating condition of a shunt cable providing an electrical voltage and current to the weld tips of a welding machine, the monitor comprising:

a plurality of electrical conductors connected to the shunt cable, producing electrical signals corresponding to voltage across the shunt cable; and a monitor unit for receiving the electrical signals, determining a shunt cable voltage across the shunt cable, comparing the shunt cable voltage to a first predetermined voltage threshold, and producing a first signal indicating cable fatigue when the shunt cable voltage exceeds the first predetermined voltage threshold.

2. The monitor of claim 1, wherein said first signal is an alert signal corresponding to a predetermined time to shunt cable failure.

3. The monitor of claim 1, wherein said first signal is a failure signal indicating the occurrence of a shunt cable failure resulting in insufficient current flow to the weld tips.

4. The monitor of claim 1, wherein said monitor unit further comprises a monitor unit for comparing the shunt cable voltage to a second predetermined voltage threshold that is greater than said first predetermined voltage threshold, producing a second signal indicating cable fatigue when the shunt cable voltage exceeds the second predetermined voltage threshold, wherein said first signal is an alert signal corresponding to a predetermined time to shunt cable failure and said second signal is a failure signal indicating the occurrence of a shunt cable failure resulting in insufficient current flow to the weld tips.

5. A system for monitoring the operating condition of robotic welding machine shunt cables, the system comprising:
   a plurality of robotic welding machines, each of said welding machine comprising:
      a pair of welding tips;
      a pair of shunt cables connected to said pair of welding tips for delivering an electrical voltage and current to said welding tips; and
      an electrical power source for providing said electrical voltage and current to said pair of shunt cables;
   a plurality of electrical conductors connected to each pair of shunt cables, producing electrical signals corresponding to voltages across each of the shunt cables; and
   a monitoring network connected to said plurality of electrical conductors, receiving said electrical signals, determining shunt cable voltages across each of said shunt cables, comparing the shunt cable voltages to a first predetermined voltage threshold, and producing a first signal corresponding to cable fatigue when at least one of said shunt cable voltages exceeds the first predetermined voltage threshold.

6. The system of claim 5, wherein said first signal is an alert signal corresponding to a predetermined time to shunt cable failure.

7. The system of claim 5, wherein said first signal is a failure signal indicating the occurrence of a shunt cable failure resulting in insufficient current flow to the weld tips.

8. The system of claim 5, wherein said monitoring network further comprises a monitoring network for comparing the shunt cable voltage to a second predetermined voltage threshold that is greater than said first predetermined voltage threshold, producing a second signal indicating cable fatigue when the shunt cable voltage exceeds the second predetermined threshold, wherein said first signal is an alert signal corresponding to a predetermined time to shunt cable failure and said second signal is a failure signal indicating the occurrence of a shunt cable failure resulting in insufficient current flow to the weld tips.

9. The system of claim 5, wherein said monitoring network comprises:
   a plurality of monitors, each of said monitors connected to unique ones of said electrical conductors, receiving the electrical signals of said unique ones of said electrical conductors, determining shunt cable voltages corresponding to the electrical signals, comparing the shunt cable voltages to predetermined thresholds, and producing the first signal corresponding to cable fatigue when a shunt cable voltage exceeds a predetermined voltage threshold;
   a plurality of monitoring units, each of said monitoring units connected to a unique one of said monitors for receiving and outputting said first signal; and
   a computer connected to said plurality of monitoring units for receiving first signals and providing to an operator an indication of cable fatigue when one or more first signals are received by said computer.

10. The system of claim 9, wherein said electrical power source of each welding machine further comprises a transformer, each of said monitors connected to unique ones of the transformers to determine whether said transformer is producing an electrical output, wherein said monitors determine a shunt cable voltage only when a transformer produces an electrical output.

11. A method of determining fatigue in a shunt cable for a welding machine, the method comprising the steps of:
   determining a shunt cable voltage across the shunt cable substantially continuously at least while the welding machine is welding;
   comparing said shunt cable voltage to a first predetermined voltage threshold; and
   producing a first signal corresponding to cable fatigue when the shunt cable voltage exceeds the first predetermined voltage threshold.

12. The method of claim 11, wherein said producing step further comprises producing a first signal corresponding to a predetermined time to shunt cable failure.

13. The method of claim 11, wherein said producing step further comprises producing a first signal indicating the occurrence of a shunt cable failure resulting in insufficient current flow to the welding machine.

14. The method of claim 11, further comprising the step of comparing said shunt cable voltage to a second predetermined voltage threshold that is greater than the first predetermined voltage threshold, wherein said first signal is an alert signal corresponding to a predetermined time to shunt cable failure and said second signal is a failure signal indicating the occurrence of a shunt cable failure resulting in insufficient current flow to the weld tips.

15. The method of claim 11, wherein said predetermined threshold is determined by:
   trending said shunt cable voltage over time to produce an average shunt cable voltage; and
   calculating a predetermined percentage of the average shunt cable voltage to produce the first predetermined voltage threshold.

16. A method of predicting the failure of any one or more of a plurality of shunt cables for a network of robotic welding machines, the method comprising the steps of:
   determining shunt cable voltages across each of the shunt cables substantially continuously during operation of the welding machines;
   comparing each shunt cable voltage to a predetermined voltage threshold; and
   producing a signal corresponding to cable fatigue when a shunt cable voltage exceeds a predetermined voltage threshold.

17. The method of claim 16, wherein said producing step further comprises producing a signal corresponding to a predetermined time to shunt cable failure when a shunt cable voltage exceeds a predetermined voltage threshold.

18. The method of claim 16, further comprising identifying which of the shunt cables has a shunt cable voltage exceeding the predetermined voltage threshold.

* * * * *